United States Patent
Bobowick

(10) Patent No.: US 7,258,940 B2
(45) Date of Patent: Aug. 21, 2007

(54) ZINC/AIR CELL

(75) Inventor: Derek R. Bobowick, Sandy Hook, CT (US)

(73) Assignee: The Gillette Company, Boston, MA (US)

( * ) Notice: Subject to any disclaimer, the term of this patent is extended or adjusted under 35 U.S.C. 154(b) by 0 days.

(21) Appl. No.: 11/293,973

(22) Filed: Dec. 5, 2005

(65) Prior Publication Data

US 2007/0128495 A1    Jun. 7, 2007

(51) Int. Cl.
*H01M 4/00*    (2006.01)
*H01M 2/08*    (2006.01)

(52) U.S. Cl. .................. 429/27; 429/174; 429/185
(58) Field of Classification Search ............... 429/27, 429/174, 185
See application file for complete search history.

(56) References Cited

U.S. PATENT DOCUMENTS

| | | | |
|---|---|---|---|
| 3,897,265 A | 7/1975 | Jaggard | |
| 5,279,905 A | 1/1994 | Mansfield | |
| 6,183,902 B1 * | 2/2001 | Malay | ............ 429/166 |
| 6,602,629 B1 | 8/2003 | Guo | |
| 6,830,847 B2 | 12/2004 | Ramaswami | |
| 2002/0192545 A1 * | 12/2002 | Ramaswami et al. | ....... 429/185 |
| 2004/0048153 A1 * | 3/2004 | Sauer | .......... 429/175 |

OTHER PUBLICATIONS

David Linden, "Handbook of batteries," 1995, McGraw-Hill, Inc., 2nd Edition, 13.6.*

* cited by examiner

*Primary Examiner*—Gregg Cantelmo
*Assistant Examiner*—Eugenia Wang
(74) *Attorney, Agent, or Firm*—Barry D. Josephs

(57) ABSTRACT

A zinc/air button cell, wherein the cell has a single casing, namely, the anode can. A substantially flat metal support disk is employed, to close the open end of the anode can, thus eliminating the need for the conventional cathode can. The metal support disk is locked in place within the open end of the anode can with insulating sealing material therebetween. The sealing material abuts a greater portion of the inside surface of the anode can than the outside surface of said can. A layer of cathode material comprising a manganese oxide, underlies the metal support disk. The cathode is locked in place against the metal support disk. The open end of the anode can is crimped axially and radially over the metal support disk with insulating sealing material therebetween. A tight seal results and the cell capacity is increased, since the cathode can has been eliminated.

33 Claims, 5 Drawing Sheets

ZINC/AIR CELL

FIELD OF THE INVENTION

The invention relates to a metal/air cell preferably having an anode comprising zinc and an air cathode. The invention relates to zinc/air button cells having a single casing, namely the anode can.

BACKGROUND

Zinc/air depolarized cells are typically in the form of miniature button cells which have particular utility as batteries for electronic hearing aids including programmable type hearing aids. Such miniature button cells typically have a disk-like cylindrical shape of diameter between about 4 and 20 mm, typically between about 4 and 16 mm and a height between about 2 and 9 mm, preferably between about 2 and 6 mm.

The miniature zinc/air button cell typically comprises an anode casing (anode can), and a cathode casing (cathode can). The anode casing and cathode casing are in the shape of separate cans each having a closed end, an open end, and integral side walls extending from the closed end to the open end. The anode casing is fitted with an insulating seal ring which tightly surrounds the anode casing side wall. Anode material is inserted into the anode casing. Air diffuser, electrolyte barrier material, and cathode assembly are inserted into the cathode casing adjacent air holes in the cathode casing. The open end of the cathode casing is then typically pushed over the open end of the anode casing so that the cathode casing side walls overlaps essentially the entire anode casing side wall with insulating seal therebetween. The anode and cathode casing are then interlocked in a second step by crimping the edge of the cathode casing over the insulator seal and anode casing side wall. During the crimping procedure (or in a separate step) radial forces are also applied to the cathode casing walls to assure tight seal between the anode and cathode casings.

Representative zinc/air button cells showing the conventional configuration with separate anode and cathode casings each in the form of "cans" having a closed end and opposing open end are shown, for example, in U.S. Pat. Nos. 3,897,265; 5,279,905; and 6,830,847 B2. As seen in each of these representative patents, the anode can and cathode can each have a closed end with opposing open end and integral side walls therebetween. After cell contents are inserted, the cathode can side wall is pushed over essentially the entire anode can side wall with insulating sealing ring therebetween. The peripheral edge of the cathode can side wall is crimped over the peripheral edge of the anode can side wall with the insulating sealing ring therebetween. Such configuration is designed to produce a durable cell with reduced chance of electrolyte leakage.

The anode casing of zinc/air button cells may be filled with a mixture comprising particulate zinc. Typically, the zinc mixture contains mercury and a gelling agent and becomes gelled when electrolyte is added to the mixture. The electrolyte is conventionally an aqueous solution of potassium hydroxide. The closed end of the cathode casing (when the casing is held in vertical position with the closed end on top) may have a flat raised portion near its center. This raised portion forms the positive terminal and typically contains a plurality of air holes therethrough. In this design, the cathode casing closed end also typically has an annular recessed step which surrounds the raised positive terminal. Alternatively, the closed end of the cathode casing may be completely flat across its diameter, that is, without any raised portion at its center. In such design the central portion of such flat area at the closed end of the cathode casing typically forms the cell's positive terminal. In either case, the closed end of the cathode casing of button zinc/air cells is punctured with one or more small air holes to allow air to enter the cell. Such air then traverses an air diffusion layer (or air diffuser) in order to reach the cathode disk.

The air diffuser material is normally composed of one or more sheets of air permeable paper or porous cellulosic material. Such permeable paper or porous cellulosic material allows incoming air to pass uniformly to the cathode assembly and also may serve as a blotter to absorb minor amounts of electrolyte which may leak into the air inlet space. The air diffuser is normally placed uniformly within the air inlet space (plenum space) between the closed end of the cathode casing and cathode assembly. The air diffuser material fills such air inlet space and covers the air holes in the closed end of the cathode casing. Commercial button size zinc/air cells which are commonly used in hearing aid devices may have only one air hole or may have a plurality of small air holes, for example, between 2 and 6 air holes and even more depending on cell size.

Catalytic material typically comprising a mixture of particulate manganese dioxide, carbon, and hydrophobic binder can be compacted into a disk shape forming a cathode disk within a cathode assembly. The cathode assembly with cathode disk therein can then be inserted into the cathode casing over the air diffuser on the side of the air diffuser that faces away from the air holes. Typically a cathode assembly is formed by laminating a layer of electrolyte barrier material (hydrophobic air permeable film), preferably Teflon (polytetrafluoroethylene), to one side of the catalytic cathode disk and an electrolyte permeable (ion permeable) separator material to the opposite side of the catalytic cathode disk. The cathode assembly with cathode disk therein is then typically inserted into the cathode casing so that its central portion covers the air diffuser and a portion of the electrolyte barrier layer rests against the inside surface of the step. The cathode disk in the final cell contacts the cathode casing walls around its perimeter.

The cathode assembly may have a flat or domed shape. The flat cathode assemblies are preferred, since they are easier and more economical to fabricate. Representative zinc/air button cells with flat cathode assemblies are shown in U.S. Pat. Nos. 5,279,905; 6,602,629 B1; and U.S. Pat. No. 6,830,847 B2.

If the cell is not adequately sealed, electrolyte can migrate around the catalytic cathode assembly and leak from the cathode casing through the air holes. Also electrolyte leakage can occur between the crimped edge of the cathode can and insulator if this area is not tightly sealed. The wall thickness of commercial zinc/air button cells are typically greater than about 6 mil (0.152 mm), for example, between about 6 and 15 mil (0.152 and 0.381 mm). The potential for leakage is greater when the anode casing and cathode casing is of very thin wall thickness, for example, between about 2 and 5 mil (0.0508 and 0.127 mm). Such low wall thickness is desirable, since it results in greater internal cell volume. But there are limits to how thin the anode and cathode can side walls can be made without sacrificing cell integrity.

After the cell is assembled a removable tab is placed over the air holes on the surface of the cathode casing. Before use, the tab is removed to expose the air holes allowing air to ingress and activate the cell.

It is desired to improve cell capacity of zinc/air button cells by increasing the available anode can internal volume for insertion of anode material therein for any given size cell.

Specifically, it is desired to increase the available anode can internal volume for insertion of anode material therein for any zinc/air button cell of given overall cell diameter and height.

It is desired that the overall cell construction result in a durable cell having a tight seal which resists electrolyte leakage.

SUMMARY OF THE INVENTION

The invention is directed to primary, non rechargeable zinc/air cells, particularly miniature zinc/air cells in the form of button cells. The term "button cell" as used herein shall mean a cylindrical cell having a height to diameter ratio of less than 1.0. An anode can having a closed end and opposing open end with integral side walls therebetween, is used to house the anode material, which comprises a slurry of zinc particles, gellant and alkaline electrolyte. Conventionally, such button cells also comprise cathode cans to house cathode material. Such conventional cathode cans are similar in construction to the anode can, that is, they are in the shape of a "can" having a closed end, opposing open end and integral side walls therebetween. In prior art zinc/air button cells after cell contents are filled into the anode and cathode cans, the cathode can side walls are pushed and crimped over the anode can side walls so that the cathode can side walls overlap the anode can side walls with insulating sealing material therebetween. That is, in conventional zinc/air button cells there is insulating sealing material abutting the outside surface of the anode can side walls so that it lies between the anode can side walls and overlapping cathode can side walls.

In the present invention the conventional cathode can has been "eliminated" and replaced with a substantially flat metal support disk, which is inserted and locked in place into the open end of the anode can. The metal support disk closes the anode can open end with insulating sealing material positioned between the peripheral edge of the metal support disk and the inside surface of the anode can. Thus, in effect the cell casing is formed of a single can, namely, the anode can with the conventional cathode can being eliminated. Since in the present invention there is in effect a single outer casing, there will be more space available within the anode casing for anode material, for a given size cell. This results in increased cell capacity upon discharge.

Preferably, the outside surface of the metal support disk faces the external environment and functions directly as the cell's positive terminal. A sheet of cathode material, desirably coated onto a metal mesh screen, is locked into position within the cell interior below the metal support disk, so that it faces air holes in the body of the metal support disk.

The zinc/air cell of the invention is desirably in the form of a miniature button cell having an anode comprising zinc and alkaline electrolyte. The cathode is typically comprised of catalytic material comprising manganese oxides, typically manganese dioxide, which is used to catalyze the electrochemical reaction between zinc and incoming air resulting in the generation of electric current. The cathode material may be formulated so that a significant portion is reduced, that is, participates directly in the electrochemical reaction during cell discharge along with incoming air. Such cell may be termed an air assisted zinc/air button cell. The zinc/air button cell of the invention has particular application as a power source for small electronic devices such as hearing aids. The cell may also be used to power other electronic devices. The miniature zinc/air button cell of the invention typically has a disk-like cylindrical shape of diameter between about 4 and 20 mm, for example, between about 4 and 16 mm, preferably between about 4 and 12 mm. The miniature zinc/air button cell has a height between about 2 and 9 mm, preferably between about 2 and 6 mm.

A major portion of the insulating sealing material is positioned so that it lies between the peripheral edge of the metal support disk and the inside surface of the anode can, that is, so that the metal support disk is electrically insulated from the anode can. The insulating sealing material "abuts a greater portion of the inside surface of the anode can than the outside surface of the anode can". Preferably there is no portion of such insulating sealing material which abuts any portion of the outside surface of the anode can. (This of course excludes any film label or printing ink which may be separately applied to the outside surface of the anode can, which serves primarily as a label for the cell, rather than as an insulating material.) Thus, in the zinc/air button cell of the present invention at least a majority of the outside surface of the anode can is exposed to the external environment. Typically, in the cell of the invention all or essentially all of the outside surface of the anode can is exposed to the external environment.

The insulating sealing material is desirably in the form of an insulating disk having a circumferential ring configuration with hollow central core. A portion of the insulating disk ring extends upwardly (when the cell is viewed with the anode casing open end on top) to form the peripheral edge of the insulating sealing disk. The insulating sealing disk peripheral edge in turn lies between the peripheral edge of the metal support disk and the inside surface of the anode can.

An end cap assembly is formed comprising the metal support disk, the insulating sealing disk, and a cathode assembly formed by coating cathode material coated onto metal mesh screen. Anode material may be filled into the can. The insulating sealing disk may be inserted into the anode can so that it seats on a ledge on the inside surface of the can near the open end of the can. The metal support disk may be in the form of a substantially flat body plate having a circumventing peripheral edge. The metal support body plate preferably has at least one air hole therethrough. The cathode may be inserted against the underside of the metal support disk. The peripheral edge of the metal support disk may then be bent inwardly to fold into a U shaped edge terminating in a tip edge which compresses, squeezes or bites into the edge of the cathode assembly thus interlocking the cathode to the support disk. The metal support disk with cathode interlocked thereto, is inserted into the can open end so that the peripheral edge of the metal support disk seats within the insulating disk and abuts the insulating sealing disk peripheral edge. Then the peripheral edge of the anode can open end is crimped over the edge of the metal support disk with said peripheral edge of the insulating sealing disk therebetween thus locking the end cap assembly into the anode can. Radial forces are also applied during the crimping process, which serves to assure that the end cap assembly and end cap assembly components are locked in place, to close the open end of the anode can and form a tight seal therein. The seal formed in this manner resists electrolyte leakage even if the cell is abused or discharged at high rate.

BRIEF DESCRIPTION OF THE DRAWINGS

The invention will be better understood with reference to the drawings in which.

DETAILED DESCRIPTION

The invention is directed principally to air depolarized electrochemical cells. Such cells have a metal anode, typically comprising a mixture of zinc and alkaline electrolyte within an anode casing, and cathode material insulated from the anode. The cell is commonly referred to as a metal/air or air-depolarized cell, and more typically a zinc/air cell.

The zinc/air cell of the invention is desirably in the form of a miniature button cell. It has particular application as a power source for small electronic devices such as hearing aids. But such cells may also be used to power other electronic devices. The button cell can be defined as a cylindrical cell having a height to diameter ratio less than 1.0 The miniature zinc/air button cell of the invention typically has a disk-like cylindrical shape of diameter between about 4 and 20 mm, for example, between about 4 and 16 mm, preferably between about 4 and 12 mm. The miniature zinc/air button cell has a height between about 2 and 9 mm, preferably between about 2 and 6 mm. A representative button cell may be a 312 size cell, namely, 0.312 inch (7.92 mm) overall diameter ×0.113 inch (2.87 mm) height cell. The miniature zinc/air button cell typically has an operating load voltage between about 1.2 Volts to 0.2 Volts. The cell typically has a substantially flat discharge voltage profile between about 1.1 and about 0.9 Volts whereupon the voltage can then fall fairly abruptly to zero. The miniature zinc/air cell can be discharged at a rate usually between about 0.2 and 25 milliAmperes.

The cell of the invention may contain added mercury, for example, about 3 percent by weight of the zinc in the anode or can be essentially mercury free (zero added mercury cell). In such zero added mercury cells there is no added mercury and the only mercury present is in trace amounts naturally occurring with the zinc. Accordingly, the cell of the invention can have a total mercury content less than about 100 parts per million parts by weight of zinc, preferably less than 40 parts per million parts (ppm) by weight of zinc, more preferably less than about 20 parts per million parts by weight of zinc. (The term "essentially mercury free" as used herein shall mean the cell has a mercury content less than about 100 parts per million parts by weight of zinc.) The cell of the invention can have a very small amount of lead additive in the anode. If lead is added to the anode, the lead content in the cell can typically be between about 100 and 1000 ppm of zinc in the anode. However, the cell desirably does not contain added amounts of lead and thus can be essentially lead free, that is, the total lead content is less than 30 ppm, desirably less than 15 ppm of zinc in the anode.

Figure 1:
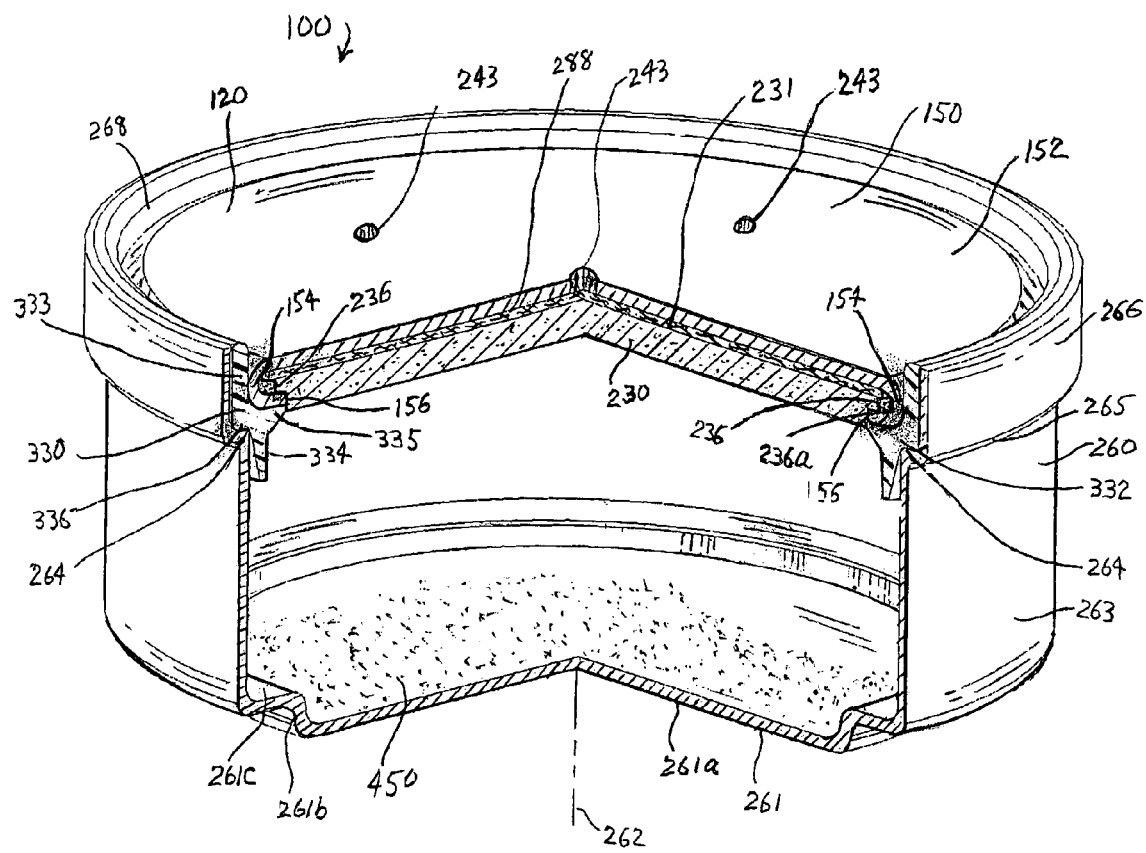
FIG. 1 is an isometric cross sectional view of an embodiment of the zinc/air cell of the invention before crimping the edge of the anode casing over the end cap assembly.
Figure 1A:
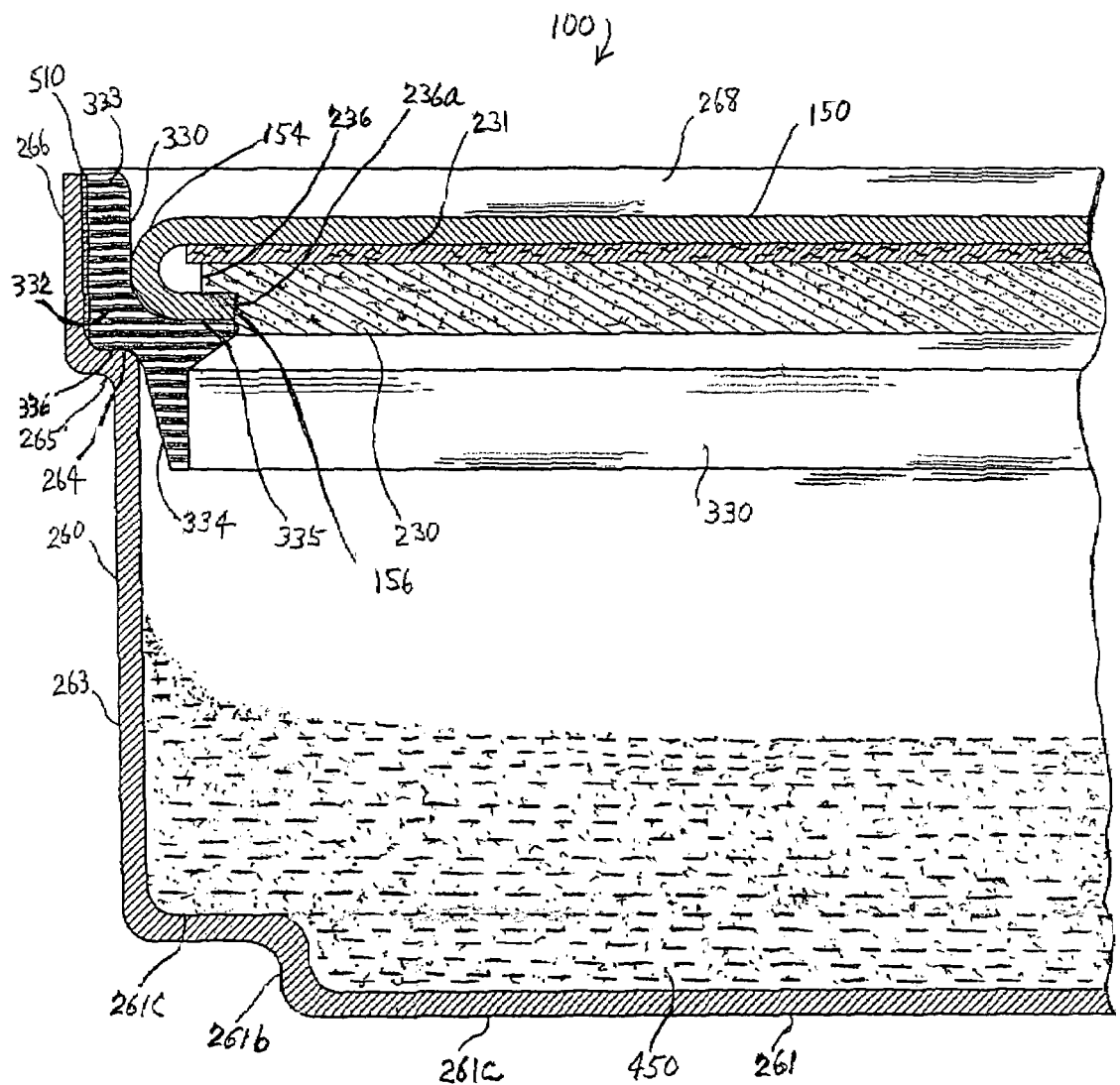
FIG. 1A is a partial cross section elevation view of the zinc/air cell of FIG. 1 with the end cap assembly of the invention inserted therein.

A zinc/air button cell 100 of the invention is shown in FIGS. 1 and 1A. Zinc/air cell 100 is characterized by having only a single cell casing, namely the anode casing (anode can) 260. Anode casing 260 is in the configuration of a "can" having a closed end 261; an opposing open end 268; and integral side walls 263 therebetween. The cathode casing (cathode can) which is conventionally pushed over the anode can side walls in such button cells has been eliminated. In place of the cathode can there is an end cap assembly 120 of the invention comprising a substantially flat metal support disk 150. The end cap assembly 120 comprises an insulating sealing disk 330, a metal support disk 150, and cathode assembly 230, and air diffuser material 231 underlying air holes 243 in metal support disk 150. The components comprising anode assembly 120 of the invention are shown best in FIGS. 1 and 3.

Zinc/air cell 100 comprises an anode casing (anode can) 260 and an end cap assembly 120 which is inserted into the anode casing 260 open end 268 closing said open end. The end cap assembly 120 comprises a metal support disk 150; an insulating sealing disk 330; a cathode assembly 230; and an air diffuser 231 placed over the cathode assembly 230. Closed end 261 of anode casing 260 comprises a flat or substantially flat surface 261a which runs along at least a major portion of the anode casing diameter. Preferably flat surface 261a extends from the center 262 of closed end 261 to cover most all of said closed end 261. Flat surface 261a terminates in an upwardly extending short arm 261b which terminates in outwardly extending circumferential step 261c which forms the edge of closed end 261. Circumferential step 261c in turn terminates in integrally formed vertical sidewall 263 which forms the body of anode casing 260. Side wall 263 terminates in a parallel peripheral edge 266 which is stepped outwardly so that it has an inside diameter slightly greater than the inside diameter of said side wall 263. A small integral circumferential ledge 264 facing the cell interior located between side wall 263 and peripheral edge 266 is thus formed. Also, there may be a circumferential indent or groove 265 on the outside surface of side wall 263 at the juncture of peripheral edge 266 and side wall 263. As shown in FIG. 1 small circumferential ledge 264 provides a seat for insulating sealing disk 330 when it is inserted into the anode casing 260.

End cap assembly 120 of the invention is inserted into the open end 268 of the anode can 260 to seal said open end. The end cap assembly 120 comprises a metal support disk 150; a sealing insulating disk 330 which insulates metal support disk 150 from the anode casing 260; a cathode assembly 230 underlying the metal support disk 150; and a diffuser material 231 underlying air holes 243 in the metal support disk 150 and inserted in the air intake space 288 between metal support disk 150 and cathode assembly 230. The metal support disk 150 is in electrical communication with cathode assembly 230. Thus, the exposed surface on the body 152 of metal support disk 150 serves as a positive terminal for the cell. As may be seen from FIGS. 1 and 1A said positive terminal 152 is electrically insulated from the anode casing 260 by insulating sealing disk 330 therebetween. The end cap assembly 120 components, namely, metal support disk 150, cathode assembly 230, and insulating sealing disk 330 "interlock" with each other. The end cap assembly 120 as a whole "interlocks" with the peripheral edge 266 of anode casing 260. The end cap assembly 120 is held tightly and permanently in place within said anode casing when the peripheral edge 266 of the anode casing 260 is crimped over the edge of metal support disk 150.

Figure 3:
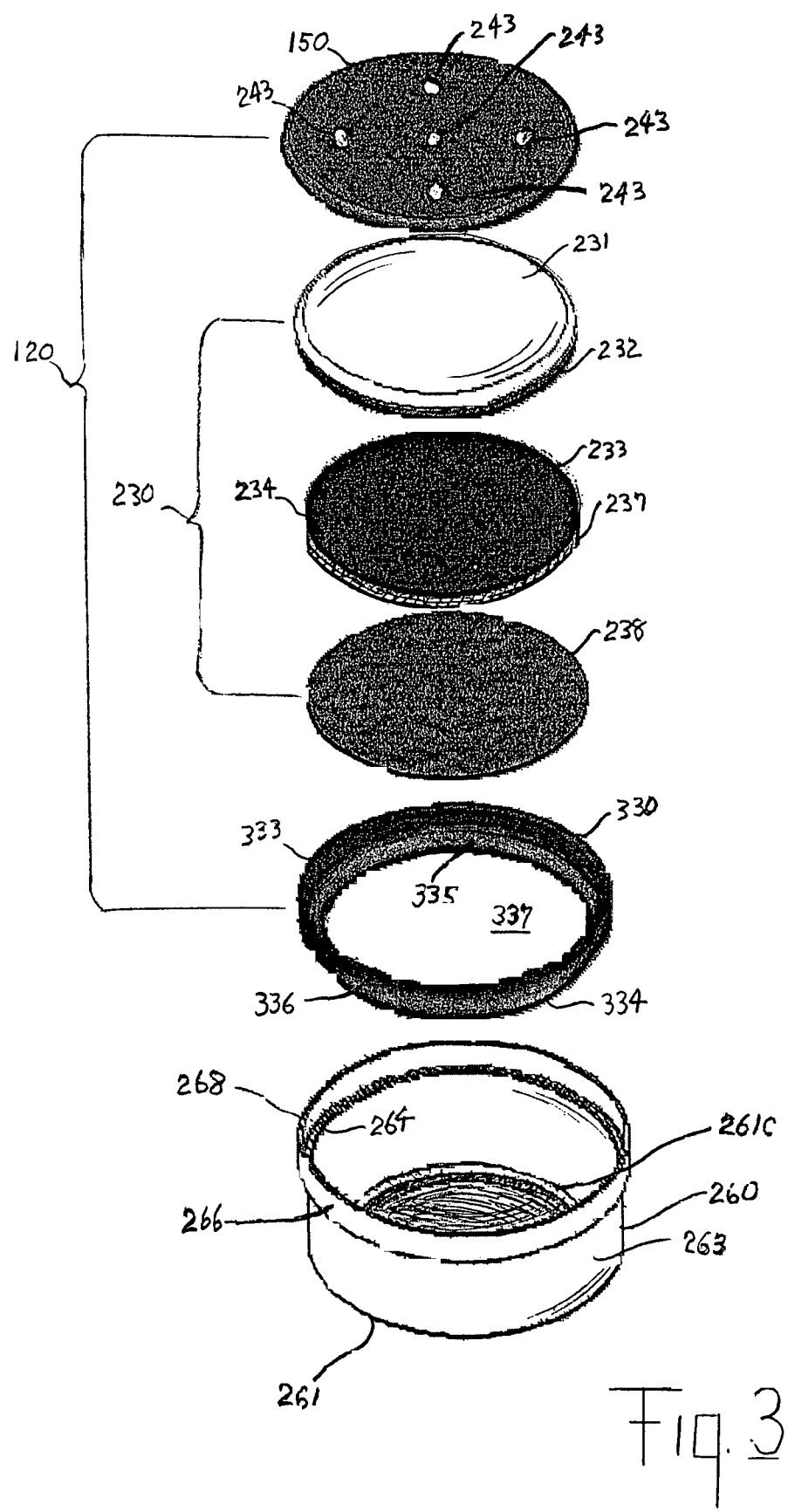
FIG. 3 is an exploded view of the components of the end cap assembly of the invention.

Insulator disk 330 is of a durable electrically insulating material such as high density polyethylene, polypropylene or nylon which resists cold flow when squeezed and resists attack by alkaline electrolyte. In a preferred embodiment (FIGS. 1 and 1A) insulating sealing disk 330 is in the configuration of a ring, preferably of nylon, with large open central core 337 (FIG. 3). Insulating disk 330 has a ring body 332 and an integral peripheral edge 333 which extends vertically upwardly from said ring body 332 (FIG. 1). There is a downwardly extending integrally formed circumferential skirt 334 which extends downwardly from said ring body 332. The bottom portion 336 of peripheral edge 333 is of sufficient width so that it mates with and seats against the inside surface of anode casing ledge 264 (FIGS. 1 and 1A). As shown skirt 334 of insulating seal 330 is slanted inwardly slightly so that it does not interfere with the seating of the insulating disk 330 on anode casing side wall ledge 264. Also ring body 332 has an integrally formed circumferential shelf 335 which extends inwardly from ring body 332 towards the cell interior as shown in FIGS. 1 and 1A. Shelf 335 provides a resting place for the peripheral edge 154 of metal support disk 150 when support disk 150 is inserted into the open end 268 of anode casing 260.

Metal support disk 150 is employed in the present invention to close the open end 268 of anode casing 260 instead of the conventional cathode can. Unlike the conventional cathode can, the metal support disk 150 of the invention is essentially a flat disk without extending side walls. Also unlike conventional cathode cans for zinc/air button cells, the metal support disk 150 of the invention abuts the "inside surface" of the anode casing 260 with insulating sealing material 330 therebetween. By contrast the conventional cathode casing for zinc/air button cells have side walls which are pushed over the outside surface of the anode casing side walls with insulating sealing material therebetween. Metal support disk 150 is formed of a flat or substantially flat body plate 152 of disk shape. There is at least one air hole 243 and typically a plurality of air holes, for example, between about 2 and 6 air holes 243 running through the body plate 152. The air hole size may vary in size, but are typically between about 0.0045 and 0.012 inches (0.114 and 0.305 mm) and may be somewhat larger or smaller depending on cell size. The peripheral edge 154 of metal support disk of 150 is bent inwardly to fold into a U shaped edge which underlies the bottom surface of the metal support body plate 152. The crimped tip edge 156 of metal support disk 150 squeezes against and thereby "interlocks" with at least the lower portion 236a of the peripheral edge 236 on cathode assembly 230. As the metal support crimped edge 156 squeezes against peripheral edge 236 of the cathode assembly 230 a circumferential bite (indent) 236a may be formed on outer edge 236 of cathode assembly 230 as shown FIGS. 1 and 1A. The U shaped edge 154 of support disk 150 abuts the inside surface of peripheral edge 333 of insulating sealing disk 330. The insulating sealing disk 330 in turn interlocks with the peripheral edge 266 of the anode casing 260.

Specifically, insulating sealing disk 330 has a peripheral edge 333 which terminates with a bottom stepped edge 336. When the insulating sealing disk 330 is inserted into the anode casing 260, the peripheral edge 333 of said sealing disk 330 interlocks at its bottom edge 336 with side wall ledge 264 on the inside surface of the anode casing 260. When the end cap assembly 120 is inserted into the open end 268 of the anode casing 260 the interlocking of end cap assembly 120 with the anode casing 260 is tightened and made permanent by crimping the peripheral edge 266 of the anode casing 260 over the edge of metal support disk 150. During crimping axial forces along longitudinal axis 262 are applied to the anode casing 260 while simultaneously bending crimp edge 267 of the anode casing 260 over the metal support disk 150. Radial forces are also applied during the crimping process so that the anode casing peripheral edge 266 is radially compressed against the edge of end cap assembly 120 and the end cap assembly components are also radially compressed against each other. Such radial compression serves to enhance the interlocking between the end cap assembly 120 components with each other. The radial compression also serves to enhance interlocking between the end cap assembly 120 as a whole and the inside surface of the anode casing 260. This produces a very tight, permanent seal which resists electrolyte leakage during normal usage and even when the cell is discharged at high rate.

Preferably, anode casing 260 is formed of a triclad material composed of stainless steel with a copper layer on its inside surface and a nickel layer on its outside surface. The copper layer is plated or clad on the inside surface of the stainless steel so that in the assembled cell the zinc anode material 450 contacts the copper layer. The copper plate is desired because it provides a highly conductive pathway for electrons passing from the anode 450 to the negative terminal, typically the anode casing closed end 261. The total wall thickness of anode casing 260 is between about 0.001 inches (0.0254 mm) and 0.015 inches (0.38 mm), desirably between about 2 and 15 mil (0.0508 and 0.381 mm), for example, between about 6 and 15 mil (0.152 and 0.381 mm). Preferably anode casing 260 has a total wall thickness between about 2 and 5 mil (0.0508 and 0.127 mm). Metal support disk 150 is preferably formed of nickel plated cold rolled steel. Metal support disk 150 is formed of a substantially flat body plate 152 having a U shaped crimped edge 154 as above described. Metal support disk 150 desirably has a uniform wall thickness of between about 4 and 8 mil (0.102 and 0.203 mm), preferably between about 4 and 6 mil (0.102 0.152 mm).

Figure 2:
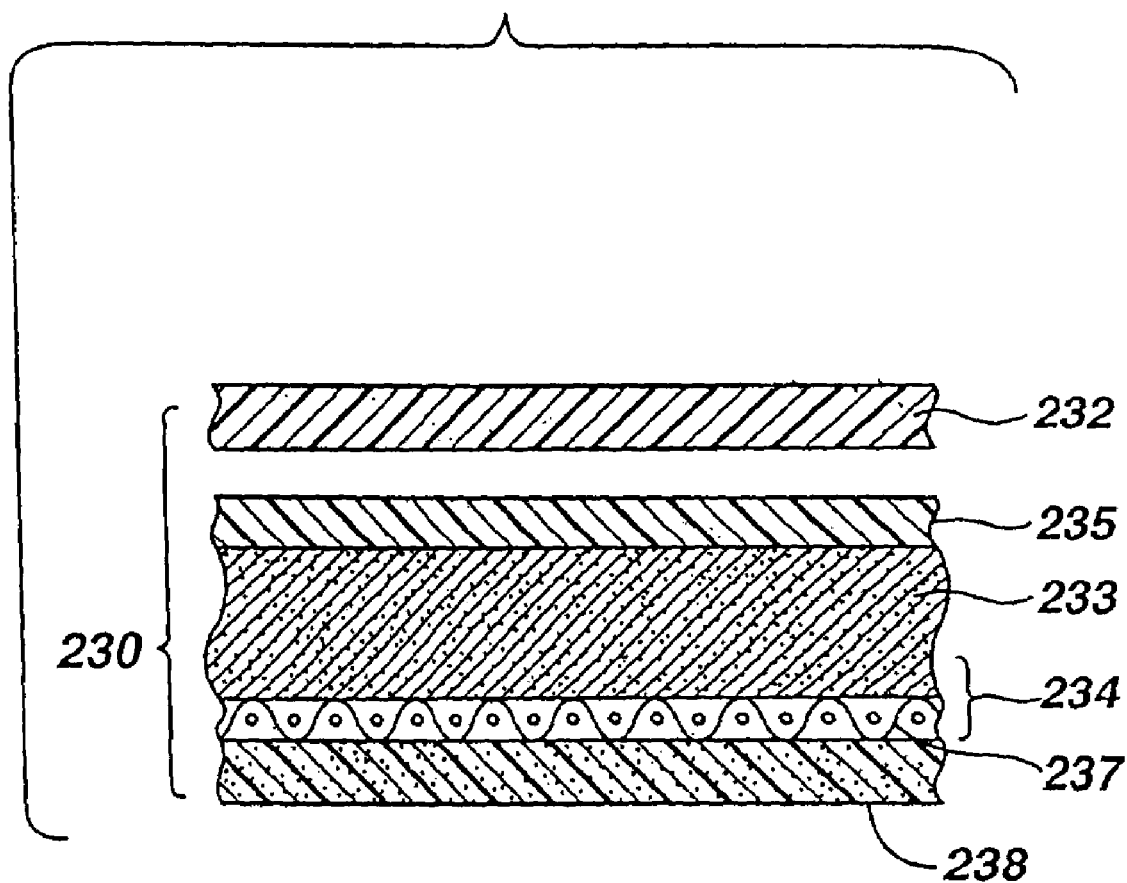
FIG. 2 is an exploded view of a preferred embodiment of the catalytic cathode assembly shown in FIG. 1.

The anode casing 260 (anode can) contains an anode mixture 450 comprising particulate zinc, and aqueous alkaline electrolyte. The particulate zinc is desirably alloyed with between about 100 and 1000 ppm indium. The zinc particles may also be plated with additional indium, preferably between about 100 and 1500 ppm indium. A cathode catalytic assembly 230 containing a catalytic composite material 234 (FIG. 2) is placed so that it underlies metal support disk 150 proximate to the air holes 243. The edge of cathode assembly 230 is interlocked with tip edge 156 of the metal support disk 150. The disk shaped catalytic composite 234 comprises a catalytic cathode mixture 233 coated on a mesh screen 237. During cell discharge, the catalytic material 233 facilitates the electrochemical reaction with ambient oxygen entering through air holes 243. Adhesive sealant 510 (FIG. 1A) preferably asphalt or polyamide adhesive, may be applied between the peripheral edge 333 of insulating sealing disk 330 and peripheral edge 266 of the anode casing 260. Such adhesive sealant, e.g. asphalt or polyamide sealant, may also be applied at the interlocking juncture between metal support disk 150 and the cathode assembly 230, namely, between cathode assembly edge 236a and metal support crimped tip edge 156. Similarly such adhesive sealant, preferably, asphalt or polyamide adhesive, may be applied between the crimped edge 154 of the metal support disk 150 and the inside surface of peripheral edge 333 of insulating sealing disk 330 (FIG. 1A).

A cathode catalytic assembly 230 (FIGS. 1 and 2) can be formed by laminating a layer of hydrophobic electrolyte barrier film material 235, preferably Teflon (polytetrafluoroethylene), to one side of the catalytic composite material 234 and an ion permeable separator material 238 to the opposite side. The separator 238 can be selected from conventional ion permeable separator materials including cellophane, polyvinylchloride, acrylonitrile, and microporous polypropylene. The electrolyte barrier film 235, preferably of Teflon, has the property that it is permeable to air, yet keeps water and electrolyte from passing therethrough. In a preferred embodiment a separate electrolyte barrier sheet 232 (FIG. 2), preferably of Teflon, can be applied over electrolyte barrier sheet 235. In this embodiment the additional electrolyte barrier sheet 232 may be considered as part of the cathode assembly 230. Conventional blotter air diffuser material 231 is of air permeable paper or porous cellulosic material which is inserted within the air inlet space 288 between metal support disk 150 and cathode assembly 230. The air diffuser material 231 lies adjacent air holes 243 in metal support disk 150.

Catalytic cathode composite 234 desirably comprises a catalytic cathode mixture 233 of particulate manganese oxides, typically manganese dioxide; carbon; and hydrophobic binder which is applied by conventional coating methods to a surface of an electrically conductive screen 237. Screen 237 may be of woven metallic fibers, for example, nickel or nickel plated steel fibers. The cathode composite 234 is formed in the shape of a disk. Other catalytic materials may be included in cathode mixture 233 such as metals like silver, platinum, palladium, and ruthenium or other oxides of metals or manganese ($MnO_x$) and other components known to catalyze the oxygen reduction reaction. During application the catalytic mixture 233 is substantially absorbed into the porous mesh of screen 237. The manganese dioxide used in the catalytic mixture 233 can be conventional battery grade manganese dioxide, for example, electrolytic manganese dioxide (EMD). The manganese dioxide in catalytic mixture 233 can be formed from the thermal decomposition of manganous nitrate $Mn(NO_3)_2$ or potassium permanganate $KMnO_4$ and thus may include other manganese oxides such as $Mn_2O_3$, and $Mn_3O_4$. The carbon used in preparation of mixture 233 can be in various forms including graphite, carbon black and acetylene black. A preferred carbon is carbon black because of its high surface area. A suitable hydrophobic binder can be polytetrafluroethylene (Teflon). The catalytic cathode mixture 233 may comprise between about 3 and 15 percent by weight manganese oxides (e.g. $MnO_2$); between about 10 and 50 percent by weight carbon, typically between about 10 and 40 percent by weight carbon black; and the remainder binder. During cell discharge the catalytic mixture 233 acts primarily as a catalyst to facilitate the electrochemical reaction involving the incoming air. However, additional manganese dioxide as well as electrolyte can be added to the catalyst and the cell can be converted to an air assisted zinc/air cell. In such cell, which can also be in the form of a button cell, at least a portion of manganese dioxide becomes discharged, that is, some manganese is reduced during electrochemical discharge along with incoming oxygen. The basic electrochemical reactions in the zinc/air cell are as follows:

On the cathode side the incoming oxygen is reduced by the following reaction consuming electrons:

$$\tfrac{1}{2}O_2 + H_2O + 2e = 2[OH]^-$$  Eq. 1

On the anode side the zinc particle are oxidized releasing electrons:

$$Zn - 2e = Zn^{+2}$$  Eq. 2

$$Zn^{+2} + 2[OH]^- = \underline{Zn[OH]_2}$$  Eq. 3

The $\underline{Zn[OH]_2}$ is a precipitant. As the cell discharges, especially with limited KOH and low water in the system, the $Zn[OH]_2$ starts to decompose to ZnO and $H_2O$ as follows:

$$Zn[OH]_2 = ZnO + H_2O$$  Eq. 4

Thus, the overall reaction for the cell may be obtained by adding reactions 1, 2, 3, and 4 to yield.

$$Zn + \tfrac{1}{2}O_2 = ZnO$$  Eq. 5

Simultaneously there is gradual gassing occurring principally by the following reaction which reduces the cell's water content and produces hydrogen gas and additional ZnO:

$$Zn + H_2O = ZnO + H_2$$  Eq. 6

The ZnO eventually builds up in the cell to coat and placate the zinc particles resulting in a reduction in zinc utilization until the cell shuts down. If the cell is not sealed properly, electrolyte can creep along weakly sealed surfaces and eventually leak from the cell. The accumulation of hydrogen gas in the cell can also promote electrolyte leakage. The end cap assembly 120 of the invention produces a very tight seal which reduces the chance of electrolyte leakage despite any gassing which occurs in the cell.

By way of a specific non-limiting example, the cell size could be a standard size 312 zinc/air cell having an outside diameter of between about 0.3025 and 0.3045 inches (7.68 and 7.73 mm) and a height of between about 0.1300 and 0.1384 inches (3.30 and 3.52 mm). The anode 450 can contain zero added mercury (mercury content can be less than 100 ppm based on zinc) and can have the following representative composition: zinc 78.0 wt % (the zinc can be alloyed with 200 to 1000 ppm each of indium and lead), electrolyte (35 wt % KOH and 2 wt % ZnO) 22.0 wt %, gelling agent (Waterlock J-550) 0.3 wt %. Sufficient anode material 450 is supplied to fill most of the available internal volume of anode casing 260, typically, between about 70 and 90 percent, to allow for expansion of the zinc anode upon cell discharge. The catalytic cathode 233 can have the following composition: $MnO_2$ 12.9 wt %, carbon black 38.7 wt %, Teflon binder 48.4 wt %, which is coated onto a nickel plated steel mesh screen 237. The cathode material 233 may typically be about 0.015 g and total cathode composite 234 (cathode 233 plus mesh screen 237) may be about 0.16 g.

Figure 4:
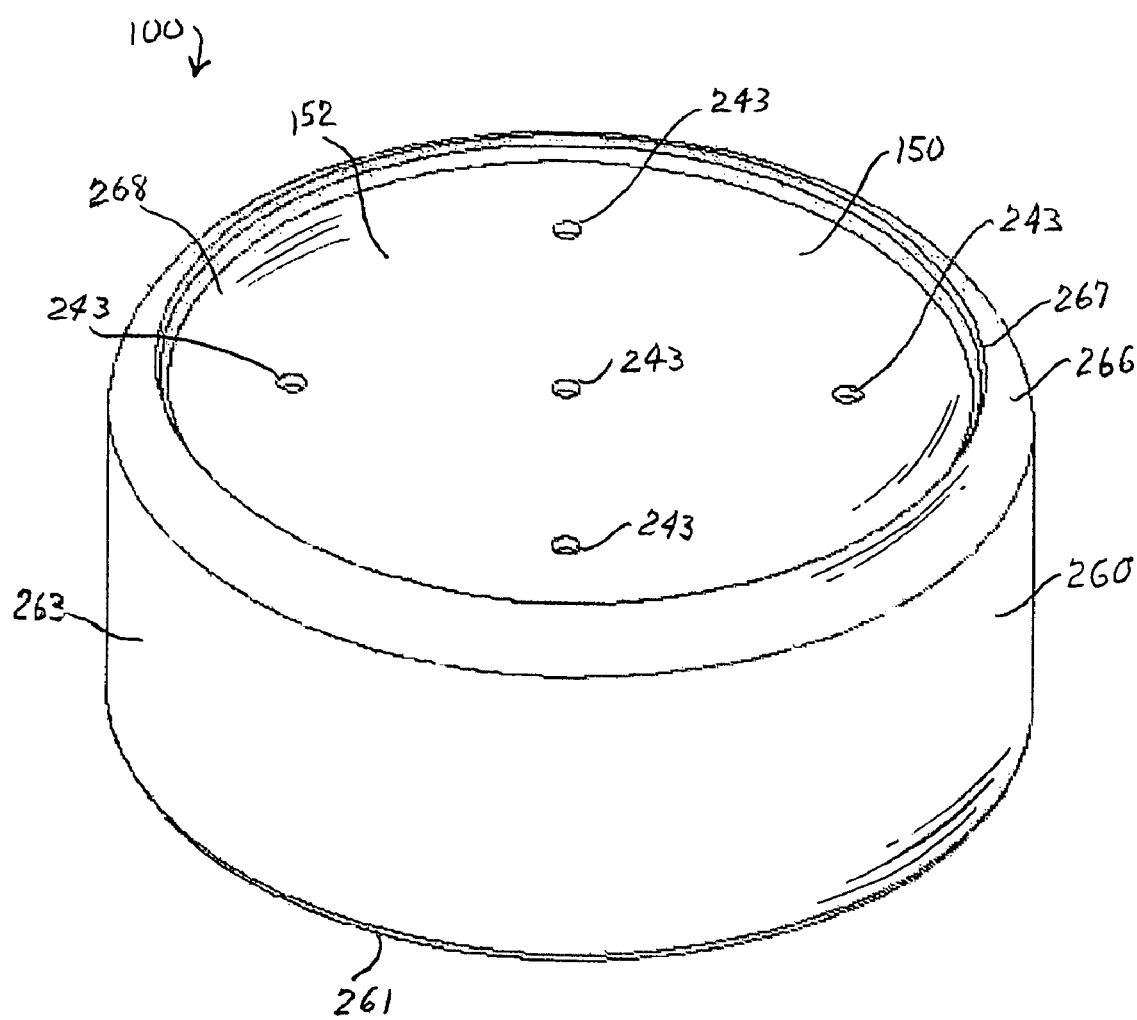
FIG. 4 is a pictorial view of the completed cell.

In assembly anode material 450 is first inserted into anode casing 260. An end cap assembly 120 comprising insulating sealing disk 330, metal support disk 150, and cathode assembly 230 components as shown in FIGS. 1 and 3 may be assembled. The insulating sealing disk 330 is inserted into the open end 268 of anode casing 260 so that it is properly seated against interior ledge 264 of the anode casing. The cathode assembly 230 may be inserted against the underside of the metal support disk 150. The peripheral edge 154 of the metal support disk may then be bent inwardly to fold into a U shaped edge terminating in a tip edge 156 which compresses, squeezes, or bites into the edge 236a of the cathode assembly thus interlocking the cathode to the support disk (FIGS. 1 and 1A). The interlocked metal support 150 and cathode assembly 230 is then inserted onto insulating sealing disk 330 so that the crimped edge 154 of the metal support disk 150 seats properly on insulating seal inner shelf 335. The peripheral edge 266 of the anode casing 260 is then crimped over metal support disk 150 as above described applying both axial and radial forces to the anode casing peripheral edge 266, while simultaneously bending the peripheral edge 266 over metal support disk 150. The resulting completed cell with end cap assembly 150 locked in place within the anode assembly is shown in FIG. 4.

Although the invention has been described with reference to specific embodiments, it should be appreciated that other embodiments are possible without departing from the concept of the invention. Thus, the invention is not intended to be limited to the specific embodiments but rather its scope is reflected by the claims and equivalents thereof.

What is claimed is:

1. A metal/air depolarized button cell comprising an anode can comprising an open end and opposing closed end with an integral side wall therebetween and said anode can has a peripheral edge at the open end thereof and an integral ledge jutting from a portion of said peripheral edge into the cell interior; a metal support disk inserted into the open end of said anode can to close said open end; an anode material comprising zinc particles, and aqueous alkaline electrolyte within said anode can; wherein said metal support disk has a disk-shaped body and a circumventing peripheral edge and at least one air hole through said body; said cell further comprising an insulating sealing material wherein at least a portion of said insulating sealing material lies between the metal support disk and the anode can to electrically insulate said metal support disk from the anode can, and a cathode underlying said metal support disk when the cell is viewed in vertical position with the metal support disk on top; wherein said anode can has an inside surface facing towards the cell interior and an outside surface facing away from said cell interior; wherein said insulating sealing material abuts a greater portion of the inside surface of said anode can than the outside surface of said anode can; wherein at least a portion of the insulating sealing material sits on said ledge jutting from a portion of the peripheral edge of said anode can; wherein said ledge is sufficiently narrow in width that said ledge does not intersect the path of a downward orthogonal projection of any portion of said cathode, when the cell is viewed in vertical position with the metal support disk on top; and wherein said insulating sealing material has an integral skirt extending downwardly passed said ledge, when the cell is viewed in vertical position with the metal support disk on top.

2. The cell of claim 1 wherein there is no portion of said insulating sealing material abutting any portion of the outside surface of said anode can.

3. The cell of claim 1 wherein at least the majority of the outside surface of said anode can is exposed to the external environment.

4. The cell of claim 1 wherein essentially all of the outside surface of the anode can is exposed to the external environment.

5. The cell of claim 1 wherein said metal support disk has a substantially flat disk-shaped body bounded by a circumventing peripheral edge and at least one air hole through said body.

6. The cell of claim 5 wherein said cathode has a disk-shaped body bounded by a circumventing outer edge and said cathode is held in place within said cell at least in part by said tip edge of said metal support disk abutting against an outer edge of said cathode.

7. The cell of claim 5 wherein the open end of said anode can is bounded by a circumventing edge thereof and said anode can edge is crimped over the peripheral edge of said metal support disk with at least a portion of said insulating sealing material therebetween.

8. The cell of claim 1 wherein said cathode comprises a manganese oxide, wherein said cathode has as a principal function catalyzing the electrochemical reaction between incoming air and said zinc particles thereby generating electric current.

9. The cell of claim 1 wherein any portion of said metal support disk may function as the cell's positive terminal and any portion of the anode can may function as the cell's negative terminal.

10. The cell of claim 1 wherein said insulating sealing material comprises electrically insulating polymeric material.

11. The cell of claim 1 wherein said cell has a cylindrical shape having a height to diameter ratio of less than 1.0.

12. The cell of claim 1 wherein said cell has a cylindrical shape of diameter between about 4 and 20 mm and height between about 2 and 9 mm.

13. A zinc/air depolarized button cell comprising an anode can comprising an open end and opposing closed end with an integral side wall therebetween; an end cap assembly inserted into the open end of said anode can to close said open end; an anode material comprising zinc particles, and aqueous alkaline electrolyte within said anode can; wherein said anode can has a peripheral edge at the open end thereof, wherein said peripheral edge has an integral ledge jutting into the cell interior; wherein said end cap assembly comprises a metal support disk having a circumventing peripheral edge and at least one air hole through said metal support disk, an insulating sealing disk covering at least a substantial portion of the peripheral edge of said metal support disk, and a cathode underlying said metal support disk when the cell is viewed in vertical position with the end cap assembly on top; wherein said anode can has an inside surface facing towards the cell interior and an outside surface facing away from said cell interior; wherein said insulating sealing disk abuts a greater portion of the inside surface of said anode can than the outside surface of said anode can; wherein at least a portion of the insulating sealing disk sits on said ledge jutting from a portion of the peripheral edge of said anode can; wherein said ledge is sufficiently narrow in width that said ledge does not intersect the path of a downward orthogonal projection of any portion of said cathode, when the cell is viewed in vertical position with the end cap assembly on top; and wherein said insulating sealing disk has an integral skirt extending downwardly passed said ledge, when the cell is viewed in vertical position with the end cap assembly on top.

14. The cell of claim 13 wherein there is no portion of said insulating sealing disk abutting any portion of the outside surface of said anode can.

15. The cell of claim 13 wherein at least the majority of the outside surface of said anode can is exposed to the external environment.

16. The cell of claim 13 wherein essentially all of the outside surface of the anode can is exposed to the external environment.

17. The cell of claim 13 wherein said metal support disk has a substantially flat body bounded by a circumventing peripheral edge and at least one air hole through said body.

18. The cell of claim 13 wherein said cathode is held in place within said end cap assembly at least in part by said metal support disk.

19. The cell of claim 13 wherein said cathode has a disk-shaped body bounded by a circumventing outer edge and said cathode is held in place within said end cap assembly at least in part by a portion of said insulating sealing disk abutting against an outer edge of said cathode.

20. The cell of claim 17 wherein said cathode has a disk-shaped body bounded by a circumventing outer edge and said cathode is held in place within said end cap assembly at least in part by said tip edge of said metal support disk abutting against an outer edge of said cathode.

21. The cell of claim 13 wherein said cathode comprises manganese dioxide, wherein said cathode has as a principal function catalyzing the electrochemical reaction between incoming air and the zinc particles thereby generating electric current.

22. The cell of claim 13 wherein a substantial portion of said insulating sealing disk lies between said metal support disk and the anode can inside surface thereby insulating said metal support disk from the anode can.

23. The cell of claim 17 wherein said insulating sealing disk has a circumferential peripheral edge bounding a hollow core, said peripheral edge lying between the peripheral edge of said metal support disk and the anode can thereby insulating said metal support disk from the anode can.

24. The cell of claim 23 wherein the open end of said anode can is bounded by a circumventing edge thereof and said anode can edge is crimped over the peripheral edge of said metal support disk with insulating sealing disk edge therebetween.

25. The cell of claim 24 wherein the circumventing edge of said anode can and the peripheral edge of said metal support disk with insulating sealing disk edge therebetween are also in radial compression.

26. The cell of claim 13 wherein any portion of said metal support disk may function as the cell's positive terminal and any portion of the anode can may function as the cell's negative terminal.

27. The cell of claim 13 wherein the metal support disk functions as the cell's positive terminal and the closed end of the anode can functions as the cell's negative terminal.

28. The cell of claim 13 wherein said insulating sealing disk comprises, electrically insulating polymeric material.

29. The cell of claim 13 wherein said cell comprises less than 100 parts by weight mercury per million parts by weight zinc.

30. The cell of claim 13 wherein the said cell has a cylindrical-shape having a height to diameter ratio of less than 1.0.

31. The cell of claim 13 wherein said cell has a cylindrical shape of diameter between about 4 and 13 mm and height between about 2 and 9 mm.

32. The cell of claim 13 wherein said anode can has a wall thickness between about 2 and 5 mil (about 0.0508 and 0.127 mm).

33. The cell of claim 13 wherein said metal support disk has a wall thickness between about 4 and 8 mil (about 0.102 and 0.203 mm).

* * * * *